United States Patent [19]

Mentink et al.

[11] Patent Number: 5,360,621

[45] Date of Patent: Nov. 1, 1994

[54] LOW-CALORIE CHOCOLATE

[75] Inventors: Léon Mentink, Estaires; Michel Serpelloni, Beuvry-les-Bethune, both of France

[73] Assignee: Roquette Freres, Lestrem, France

[21] Appl. No.: 877,962

[22] Filed: May 1, 1992

[30] Foreign Application Priority Data

May 6, 1991 [FR] France ................. 91 05511

[51] Int. Cl.⁵ ............................... A23G 1/00
[52] U.S. Cl. ................... 426/548; 426/631; 426/660; 426/804
[58] Field of Search ........... 426/631, 804, 660, 607, 426/548

[56] References Cited

U.S. PATENT DOCUMENTS

| | | |
|---|---|---|
| 2,487,931 | 11/1949 | Lataner . |
| 3,957,976 | 5/1976 | Sugimoto . |
| 4,011,349 | 3/1977 | Riesen ................. 426/804 |
| 4,017,645 | 3/1977 | Zicarelli . |
| 4,408,041 | 10/1983 | Hirao . |
| 4,980,189 | 12/1990 | Keme et al. . |
| 5,223,303 | 6/1993 | Taskinen ................. 426/548 |

FOREIGN PATENT DOCUMENTS

| | | |
|---|---|---|
| 0284747 | 2/1988 | European Pat. Off. . |
| 0285187 | 2/1988 | European Pat. Off. . |
| 0390299 | 3/1990 | European Pat. Off. . |
| 0677429 | 11/1988 | Switzerland . |
| 677429 | 5/1991 | Switzerland ......... 426/631 |
| 1414384 | 11/1973 | United Kingdom . |
| 1472510 | 5/1975 | United Kingdom . |
| 89/00142 | 8/1989 | WIPO . |
| 91/09537 | 7/1991 | WIPO ................. 426/548 |

OTHER PUBLICATIONS

21 CFR 163.123 and 163.130.
Chemical Abstract of JP 60 23 20 58.
Technical Information:TOWA Chemical Industry Co., 1990.
Developments in Dietetic Chocolate by Miss Anne Cridland, 1987.
Malbit–Maltitol by Dr. Celia, 1985.

*Primary Examiner*—Carolyn Paden
*Attorney, Agent, or Firm*—Larson and Taylor

[57] ABSTRACT

The invention relates to a low-calorie chocolate containing:
- fat, preferably derived from cocoa,
- a sweetening mass,
- at least one emulsifier,
- and, optionally, desiccated defatted cocoa and/or a pulverulent milky product or a derivative thereof, characterized in that it has a total fat content of less than 32% by weight, preferably less than 31% by weight and still more preferably less than 29% by weight relative to all of the abovementioned ingredients, and in that the sweetening mass is based on at least one product chosen from the group consisting of crystallized maltitol of high purity, lactitol, hydrogenated isomaltulose and low-calorie saccharide polymers.

24 Claims, No Drawings

LOW-CALORIE CHOCOLATE

BACKGROUND OF THE INVENTION

The present invention relates to a novel low-calorie chocolate and to a process for manufacturing the said chocolate.

Three types of chocolate can be distinguished: dark chocolate, milk chocolate and white chocolate.

Generally, traditional dark chocolate may be defined as a product which is obtained from cocoa paste consisting of a cocoa liquor containing about 54% of fatty substances, sucrose and cocoa butter. Milk chocolate contains milk in addition to the dry matter. White chocolate also contains milk but lacks desiccated defatted cocoa.

All these chocolates may contain filling ingredients such as hazel nuts, crisped rice, desiccated fruits or the like.

From a physical point of view, a chocolate may be assimilated with a practically anhydrous dispersion of very fine nonfatty particles (sucrose, lactose, proteins, minerals and the like) in a solidified fatty phase consisting essentially of triglycerides. The latter are solely derived from cocoa in the case of a dark chocolate, but are derived from milk in the case of milk or white chocolate.

A conventional process for the manufacture of chocolate comprises the following successive essential stages: kneading—refining—optionally dry conching—liquid conching—tempering—moulding—cooling—packaging.

Kneading is intended to produce a homogeneous paste from sugar, cocoa paste and optionally from cocoa butter and milk powder. The operation is carried out in a mechanical kneading machine. The paste obtained should have a specific texture, which is appropriate for the subsequent refining operation. It is possible to control the texture by the choice of the particle size of the sugar and also by the fat content.

Refining consists in rolling the paste obtained from the kneading, between steel rollers so as to reduce the size of the particles to less than 25 microns. This operation transforms the initial paste into a fine powder which is hygroscopic and capable of trapping ambient odours. At this stage, it is therefore desirable for conching to take place as rapidly as possible.

Conching is essential for modifying the flavour and improving the rheological characteristics of the chocolate. This operation can be carried out in a single stage (liquid conching) or in two stages (dry and then liquid conching) and may last from a few hours to several days. The refined powder is worked at high temperature, at around 75°–80° C. in the case of a dark chocolate, and at around 65° C. for white and milk chocolates. Dry conching consists in performing this high temperature working in the absence of high fat contents. It enables the conching time to be reduced.

The chocolate flavour is developed during this operation. By virtue of the temperature increase and the aeration of the mass used, undesirable compounds such as aldehydes and short-chain fatty acids escape from the mass by volatilisation while other flavouring compounds are formed. Furthermore, the rheology of the product changes: the powder obtained at the end of the refining progresses towards the pasty state. The insoluble particles (of sugar, cocoa, milk and the like) are dissociated by friction and separation of water and become rounded so as to communicate greater flowability to the paste, with a lower yield point. To further improve these characteristics, lecithin is added to the chocolate a few hours before the end of conching. The lecithin coats the sugar particles and emulsifies the residual traces of water to give the chocolate good flow properties which are essential for the subsequent moulding stage.

Tempering of the chocolate is intended to permit crystallisation of the cocoa butter in stable form. For that, the chocolate paste is adjusted to a temperature of about 29° C., sometimes slightly less, so as to create seed crystals of all sorts, and then to a slightly higher temperature during the moulding, so as to melt the unstable crystalline forms.

Moulding is an operation for shaping chocolate, for example, into tablets or into figurines. The chocolates may be solid or filled. So-called "couverture" chocolate, which is intended for coating the surface of products such as cakes, cereal bars, candied fruits and the like, also exists.

During the cooling stage, the fatty substance congeals by crystallisation into a stable form if the tempering operation was well conducted. In the opposite case, the chocolate may be difficult to remove from moulds, may melt between the fingers and may also deteriorate over time due to a phenomenon called fat bloom.

Other production techniques are sometimes used. The one best known is the "crumb" technique which is widely used in England for the production of milk chocolates. It consists in mixing milk or concentrated milk products containing 30–40% dry matter with sugar, in heating the mixture to boiling point under vacuum at about 75° C. and in working this mixture with cocoa paste before drying under high vacuum in order to obtain a powder containing less than 1% water. This process makes it possible to obtain a milk chocolate having organoleptic properties which are very different from those obtained with the conventional method.

Sucrose has been the reference sweetening mass since the beginning of the chocolate industry. Its organoleptic and technological properties render it particularly suitable for this type of confectionery product.

On the other hand, its nutritional properties may be open to criticism. Indeed, sucrose has a calorific value of 4 kcal/g, which gives to the chocolate, of which sucrose is the essential constituent, a high calorific value.

Moreover, it is known that sugar is completely contraindicated for diabetics because the glucose constituting it can be rapidly assimilated by the organism, which may generate severe hyperglycemia in these patients.

Finally, sucrose is a substrate which can be fermented by the commensal bacteria in the mouth, which convert it to corrosive acids which are responsible for tooth decay.

To overcome these disadvantages, the idea was developed to substitute polyols for sucrose in chocolate. These polyols may be in particular hydrogenated monosaccharides such as sorbitol, mannitol, xylitol, erythritol or hydrogenated disaccharides such as maltitol, lactitol, hydrogenated isomaltulose (equimolar mixture of 1,6-glucopyranosylsorbitol and 1,6-glucopyranosylmannitol).

In the pure state, these polyols have no reducing power and are not fermented into acids by the flora of the buccal cavity. They therefore permit the manufacture of noncariogenic chocolates insofar as the other ingredients of the formulation do not provide fermentable sugars. In the case of milk chocolates and white chocolates, the milk may be replaced by lactose-free milk ingredients so as to best ensure this hypocariogenicity.

Polyols are slowly metabolised and they do not cause a sharp rise in the level of blood glucose following their consumption. Consequently, they are often recommended in the diet for diabetics.

Furthermore, their calorific value is estimated at a mean value of 2.4 kcal/g (10.0 KJ/g), that is to say about 60% of that for sugar.

However, as far as calorie reduction is concerned, it can only be observed that it still remains limited in the case of the polyol-containing chocolates currently available, this being for the simple reason that in addition to the calorific value of the sweetening mass, there is the substantially greater calorific value of fatty substances which constitute another essential ingredient of the chocolate.

These fatty substances are in the form of triglycerides and are generally obtained from cocoa and/or milk. They differ from other fatty substances in their capacity to be metabolised, at least partially, without causing gastrointestinal disorders or without even affecting the metabolism of vitamins.

Their calorific value indeed amounts to 9 kcal/g. Furthermore, they are essentially in a saturated form. They are not therefore particularly recommended by nutritionists and are against the current concern of consumers to limit the excessive supply of calories by diet.

To respond to this concern, it would therefore be appropriate, in the case of chocolate, to replace sucrose with a low-calorie substitute, polyols being especially quite suitable for this purpose, but also to reduce the amount of fatty substances. However, there are technological manufacturing imperatives including in particular the rheological properties which are necessary in order to perform the refining, conching and moulding operations under satisfactory conditions, which a priori prevent a substantial reduction in the fat content in polyol-containing chocolates.

This is true particularly for refining, which is a stage in which the paste must be sufficiently cohesive in order to be properly suitable for grinding in the rollers of the refining device. A paste which is too dry would render the rolling impossible. Furthermore, the fatty substances are essential in order to impart malleability to the paste, which permits good refining. At this stage of the manufacture, it seemed, until now, impossible to have a fat content of less than 28% for polyol-containing chocolate. Such a threshold would deprive the manufacturer of the advantageous opportunity of applying dry conching which promotes the separation of water.

These fatty substances are also very important during conching and moulding because they impart the appropriate rheology to the paste and temper the effects of the polyols which, by virtue of their hygroscopicity, rather tend to increase this viscosity as will be seen below. It should be noted that the addition of an emulsifier such as lecithin, which is prior to conching and which is intended to reduce the viscosity of the chocolate paste, can compensate the reduction in the fat content only to a certain degree. Indeed, an excess of lecithin would lead to the formation of too stable a water-in-oil emulsion which would prevent the evaporation of water and volatile compounds which is sought during conching, and, worse still, may also lead to an effect which is the reverse of that sought, namely an increase in the yield point of the chocolate paste.

There is another difficulty to be overcome when attempts are made to reduce the fat content of a chocolate. Indeed, one of the roles of the fatty substance in chocolate is to form a continuous and solid cross-linkage between the cocoa particles and the particles of sweetening agent. It constitutes, in a way, a cement which ensures the cohesion, the consistency and the hardness of the chocolate after cooling. It should therefore be ensured that these properties are not affected.

Finally, the greater the reduction in fatty substances, the more difficult it is for the fatty phase to crystallise in a stable crystalline state, that is to say one which enables the chocolate not to progress towards a matt and whitish appearance which is typical of the phenomenon known as fat bloom and which is quite damaging to the product.

It therefore appeared impossible, until now, to manufacture polyol-containing chocolates containing less than 32%, preferably less than 31%, and still more preferably less than 29% of fatty substances.

Moreover, as already mentioned, some polyols may be constraining with respect to the chocolate manufacturing process especially because of their high hygroscopicity which poses problems as regards storage and during the implementation of the process. It is thus recommended to provide for the use of conditioned atmospheres with controlled humidity levels in order to avoid water being taken up. This phenomenon is observed for sorbitol in particular.

Still with respect to these hygroscopicity problems, the brittleness and the morphology of the crystalline powders of some polyols, such as sorbitol and hydrogenated isomaltulose, cause, during refining, the formation of particles having a specific surface area which is greater than that of sugar. This renders the worked paste more hygroscopic and therefore more viscous, and requires the use of a higher amount of fatty substances in order to improve the rheological behaviour of this paste.

Moreover, the temperature increases which occur directly or indirectly during the grinding, kneading, refining, or conching operations render the polyols more unstable.

Firstly, their hygroscopicity increases. In the specific case of sorbitol, the critical relative humidity which should not be exceeded in the manufacturing environment, thereby drops from 73% to 62% when the temperature is increased from 20° to 40° C.

Secondly, the temperature increases may result in a disorganisation of the crystalline states, by releasing the water of crystallisation when the relative humidity is low for the polyols of hydrated crystalline form (hydrogenated isomaltulose, lactitol monohydrate and the like), or by melting of the crystals for the polyols having a low melting point (xylitol, sorbitol and the like), this melting of the crystals corresponding to their transition to a very hygroscopic amorphous state.

It was therefore necessary to limit the conching temperature for example to 40°–48° C. for sorbitol and to 65° C. for lactitol monohydrate, all the more so since the phenomenon of water regain increases per se much more substantially at high temperature than at low temperature given that polyols are thereby more soluble and therefore pass more rapidly and more easily from the crystalline state to the hygroscopic amorphous state, thus intensifying the regain of water.

However, it should be noted that the regain of water during conching leads to thickening or even to agglomeration of the worked paste. Moulding therefore becomes very difficult or impossible and, in any case, the finished product is of poor quality. For example, it has a grainy and sandy texture.

This conching temperature limitation reduces the effects of this stage which is essential for developing the chocolate flavour and for improving its rheological qualities. And increasing the conching time, which is economically damaging to the manufacturer, does not really enable this disadvantage to be overcome: the removal of water and bitter volatile compounds by evaporation is inadequate.

The only remaining solution therefore is to use raw materials lacking water and more highly processed, and therefore more expensive.

To illustrate this inability of chocolate manufacturers to bring under control the reduction of the fat content of polyol-containing chocolates, as well as the technological problems affecting manufacture which are linked to the physicochemical properties of these ingredients, there may be mentioned for example Patent FR 2,201,042 which, in Example 18, p. 20 of the description, discloses the preparation of a sucrose- and lactitol-containing chocolate containing not less than 32% by weight of fatty substances, and this is a threshold below which it is impossible to manufacture chocolate. But it still represents a relatively high amount and this is all the more so since the sweetening mass essentially consists of sucrose which is a high-calorie and cariogenic product.

Similarly, Patent FR 2,499,576 relating to anhydrous maltitol crystals, teaches, in Example 10 thereof, the application of the said crystallised maltitol in the manufacture of sugar-free chocolate, but this chocolate still contains 32% by weight of fatty substances.

European Patent Application No. 0317917, for its part, relates to a process for manufacturing sugar-free and noncariogenic milk chocolate using the so-called "crumb" technique. The sugar substitutes used in this process are maltitol, lactitol or hydrogenated isomaltulose (equimolar mixture of 1,6-glucopyranosylmannitol and 1,6-glucopyranosylsorbitol, which is marketed under the registered trade mark ISOMALT). The chocolates manufactured according to this process have a fat content which is not less than 35% by weight. It should also be noted that the "crumb" technique is quite special and differs substantially from traditional techniques for manufacturing chocolate.

The technical presumption that it was a priori technically impossible to reduce the fat content of polyol-containing chocolate, of maltitol-containing chocolate in particular, below 32% by weight, is clearly evident from Japanese Patent Application No. 60/232058 which describes a chocolate in which sugar is replaced with a mixture of maltitol powder and lactose or maltose or mannitol or a mixture of these. The fat content of some of the chocolates, whose preparation is described in the examples and in the control tests, is of the order of 26.5% by weight, but it is explicitly indicated in this patent application that the chocolate, whose sweetening mass consists solely of maltitol (control 2), is of poor quality, namely that it is granular, that it has a sweet taste which is unsatisfactory and that it has a sandy feel on the tongue. Furthermore, it is also stressed that its production process is very difficult to implement. The polyol used consists of a maltitol syrup powder. This maltitol-containing chocolate is used, moreover, as negative control which is intended to demonstrate the advantages of the invention which is claimed in this application and which, precisely, provides for the use of the mixture of maltitol and at least one other sugar such as maltose, lactose or mannitol, in order to overcome the disadvantages of a low-fat chocolate whose sweetening mass would consist solely of a polyol such as maltitol. The reading of this document could only therefore have convinced a person skilled in the art not to use maltitol as sweetening mass for preparing a low-fat polyol-containing chocolate.

With respect to maltitol and this problem of reducing the fat content of foodstuffs, European Patent Application No. 390,299 should also be mentioned, which relates to an improved, fat-containing foodstuff in which the improvement consists in the complete or partial replacement of the fat by an amount of maltitol which is effective tastewise. On the one hand, the trivial nature of this invention will not pass unnoticed, knowing, in particular, that maltitol has been known as a sugar substitute for quite some time, and neither, on the other hand, will the fact that the chocolate is not explicitly mentioned among the products which are the target of this invention. Consequently, the problems which are specific to the processes for manufacturing chocolate, such as for example the regain of water and the rheological behaviour which have been mentioned above, are absolutely not addressed. Yet, as has been seen, these specific problems are such that they can greatly hamper the reduction of fatty substances in chocolate.

Moreover, only the complete substitution of maltitol for fatty substances is addressed in this patent application. Yet, it is not inconceivable that the reduction of fatty substances in fatty and sugary foodstuffs such as chocolate, could be compensated for by an increase in the amount of desiccated defatted cocoa. The content of this patent application is not to be taken into account within the context of reducing the fat content of chocolate. And this may furthermore be confirmed by a technical publication, dated Jan. 6, 1990, from the patentee of this European patent application, the company TOWA CHEMICAL INDUSTRY Co., relating to maltitol powder which is marketed by it under the registered trade mark AMALTY.

This publication indeed contains, page 4, an example of application of AMALTY to the preparation of chocolate. The no. 1 handling precaution which is mentioned therein stipulates that the amount of cocoa butter should be slightly increased given that AMALTY absorbs more fat than does sugar because of its greater porosity. Moreover, it is evident that the fat content in the maltitol-containing milk chocolate formulation proposed is about 38.4% by weight.

Therefore, nothing in this document indicates or even suggests that a polyol such as maltitol is suitable for manufacturing chocolate with a reduced fat content.

Another article, which appeared in CONFECTIONERY MANUFACTURE & MARKETING Vol. 22, No. 5 of MAY 1985, mentions the application of maltitol powder which is marketed under the trade mark MALBIT by the company MELIDA, in the preparation of chocolate with a reduced fat content. It is again evident that this reduction is limited to 36–37% by weight for milk chocolate.

With respect to another polyol which is used as sweetening mass in sugar-free chocolate, namely lactitol monohydrate, Patent Application WO 90/06317 teaches that the fat content achieved for dark chocolate and milk chocolate, prepared using the said polyol (Examples 4 and 5), is 33% and 32.5% by weight respectively.

This technological deficiency may be extended to many polyols other than those mentioned above. And this is supported by the article by Anne CRIDLAND entitled "Developments in dietetic chocolate" which appeared in Volume 24, No. 10, of 1987, pp. 2 to 6 of the journal CONFECTIONERY MANUFACTURE & MARKETING, in which the author explains, page 6, in the paragraph entitled "Fat", that the fat in chocolate is probably the most important element with regard to the technical and textural properties of the product and that there is in existence no chocolate with a reduced calorific value and with a pleasant taste, which satisfies the required technical functions.

Acknowledging this state of the art, the applicant company set itself the objective of developing a low-calorie chocolate which, although having a very reduced fat content, being less than 32%, preferably less than 31% and still more preferably less than 29% by weight, would have technological and organoleptic properties comparable to those of traditional sucrose containing chocolate.

Comparable technological properties are understood to mean both the properties of the chocolate obtained and the possibility of having recourse to a conventional technology for its manufacture, and using, up to the conching stage, the same ingredients as for a conventional chocolate, except for the sweetening mass. The desired aim is in fact to dispense, as far as possible, with, on the one hand, operational constraints such as a conditioned atmosphere, a sophisticated equipment or a long manufacturing time, and, on the other hand, technical difficulties such as the regain of water, poor rheological behaviour or limitation of the conching temperature.

And it was after numerous tests and studies that the applicant company took the credit for finding that the above-defined objective could be achieved provided that products selected from the group consisting of crystallised maltitol of high purity, lactitol, hydrogenated isomaltulose or low-calorie saccharide polymers or a mixture thereof, are used for constituting the sweetening mass.

SUMMARY OF THE INVENTION

The subject of the present invention is therefore a low-calorie chocolate containing, before conching, fat, a sweetening mass, at least one emulsifier and optionally desiccated defatted cocoa and/or a pulverulent milky product or a derivative thereof, characterised in that it has a total fat content of less than 32% by weight, preferably less than 31% and still more preferably less than 29% by weight relative to all of the abovementioned ingredients, and in that the sweetening mass is based on at least one product chosen from the group consisting of crystallised maltitol of high purity, lactitol, hydrogenated isomaltulose and low-calorie saccharide polymers.

DESCRIPTION OF PREFERRED EMBODIMENTS

The fat content of the chocolate according to the invention is preferably greater than 20% by weight and still more preferably greater than 25%.

The term chocolate is understood to mean both dark chocolate and milk chocolate or white chocolate, which may serve as the basis for the manufacture of solid, filled or couverture articles, with or without the addition of filling elements.

Sweetening mass is understood to mean, within the context of the present invention, any product or mixture of products other than the cocoa fat, the desiccated defatted cocoa, the pulverulent milky products or derivatives thereof and the emulsifiers, which are added before conching and are capable of forming the main constituent of the chocolate and of imparting a sweet taste thereto.

Accordingly, the filling ingredients added during or after the conching stage, such as cereals or fruits such as dried raisins or hazelnuts for example, are not considered as constituents of the sweetening mass.

In conformity with the invention, the sweetening mass consists of at least one product selected from crystallised maltitol of high purity, pulverulent lactitol, pulverulent hydrogenated isomaltulos and pulverulent low-calorie saccharide polymers.

Crystallised maltitol of high purity is understood to mean crystallised maltitol having a maltitol content, expressed as dry/dry weight, of not less than 92%, preferably not less than 95% and still more preferably not less than 97%.

As far as lactitol is concerned, lactitol monohydrate is preferably used.

As for crystallised hydrogenated isomaltulose, the one marketed under the trade mark PALATINIT or under the name ISOMALT by the company SUD ZUCKER, may for example be used.

These products, which are selected in conformity with the invention, enable low-calorie and hypocariogenic chocolate having satisfactory organoleptic qualities to be obtained, and enable satisfactory manufacturing conditions to be ensured.

Advantageously, the constituents of the sweetening mass are in anhydrous or dehydrated form, that is to say comprise less than 1% and preferably less than 0.5% water.

Desiccated defatted cocoa is understood to mean, within the context of the present invention, desiccated cocoa material lacking fatty substances. In practice, cocoa liquor containing about 54% of fat is generally used, the complementary cocoa fat being provided by the cocoa butter.

The term pulverulent milky product or derivative thereof denotes in particular whole milk powders or skimmed milk powders, optionally rendered lactose free so as to remove most of the cariogenic lactose, as well as any similar powder of milk origin: whey and buttermilk powder for example.

Very good behaviour is obtained for the worked paste during the refining, conching and moulding operations, by selecting such a composition for the chocolate.

For the refining, it can be observed that the grinding proceeds easily because the paste possesses good film-forming properties and produces a refined and ground powder with no exudation of fatty substances.

The conching proceeds without problems of agglomeration of the paste which has good rheological properties.

Similarly, the evaporation of bitter compounds and the construction of a proper and adequate flavour profile occurs in a satisfactory manner, especially due to the fact that it is possible to provide for the use of dry conching with conching temperatures preferably greater than or equal to 45° C., which is quite unusual in polyol-containing chocolate technology.

The chocolate obtained, while being hypocariogenic, has a pleasant sugary taste such that it is not necessarily essential to add thereto an intense sweetening agent, a product which is generally unstable and expensive, in order to possess a product comparable to its traditional equivalent containing sucrose.

Among the products which are particularly suitable for implementing the invention, crystallised maltitol, whose chemical purity is greater than 99% by weight such as that obtained according to the manufacturing process described in European Patent No. 189704, the patentee of which is the company ROQUETTE FRERES, will be retained.

With respect to lactitol, the one marketed in crystallised monohydrate form by the company CCA Biochem BV, under the registered trade mark LACTY, may be suitable. It should however be stated that it is preferable to subject the lactitol monohydrate to dehydration before using it in the chocolate according to the invention.

In the case of crystallised hydrogenated isomaltulose, the one marketed by the company SUDDEUTSCHE ZUCKER GmbH under the trade mark PALATINIT or under the name ISOMALT, may be chosen as stated above. As in the case of lactitol, this product will preferably be used in dehydrated form.

The low-calorie saccharide polymers may be chosen from glucose or fructose polymers or vegetable fibres which are not assimilable by the body.

It has been observed that the polymer resulting from the condensation of glucose in the presence of citric acid and sorbitol (these products acting as catalyst and plasticiser respectively) has been very suitable as constituent of the sweetening mass in the chocolate conforming to the invention.

This type of product is marketed by the company PFIZER under the trade marks POLYDEXTROSE and LITESSE.

Similarly, the fructo-oligosaccharides, also called neosugars and obtained by enzymatic action on sucrose, which comprise for example the product marketed under the trade mark ACTILIGHT by the company BEGHIN SAY, have proved to be usable in the chocolate conforming to the invention.

Intense sweetening agents such as aspartame, acesulfame K or the like or alternatively polyols with high sweetening power such as xylitol or erythritol may also be used in constituting the sweetening mass of the chocolate conforming to the invention.

According to a preferred embodiment, the chocolate conforming to the invention contains from 35% to 65% by weight, preferably from 45 to 55% by weight of crystallised polyol constituting the sweetening mass, and 20 to 32%, preferably 25% to 32% by weight of fat, this fat being preferably derived from cocoa and/or milk.

Obviously, filling products such as cereals and/or dried fruits (hazelnuts, almonds, raisins and the like) may be added to the chocolate conforming to the invention.

The subject of the present invention is also a process for manufacturing low-calorie chocolate containing the following ingredients:
 fat, preferably derived from cocoa,
 a sweetening mass,
 an emulsifier,
 and, optionally, desiccated defatted cocoa and/or a pulverulent milky product or a derivative thereof.

This process essentially comprises the following successive stages:
 kneading, at high temperature, of the cocoa fat, the sweetening mass and, optionally, the desiccated defatted cocoa and/or the pulverulent milky product or a derivative thereof, which enables a homogeneous paste to be obtained,
 refining of the paste which enables a powder to be obtained,
 optionally, dry conching at high temperature of the powder,
 liquid conching, at high temperature, of the powder after adding cocoa butter and an emulsifier such as lecithin,
 tempering at a temperature less than the conching temperature,
 moulding,
 cooling,
 packaging.

It is characterised in that the fat content of the paste during refining is fixed at between 20 and 28% by weight, whereas it is fixed at a value less than 32% by weight at the time of moulding, and in that the sweetening mass is based on crystallised maltitol of high purity, pulverulent lactitol, pulverulent hydrogenated isomaltulose, pulverulent low-calorie saccharide polymers or a mixture of these products.

In a manner which is different from those provided by the processes known for manufacturing polyol-containing chocolate, the process according to the invention makes it possible to work with reduced fat contents without technological difficulties being thereby posed and without affecting the quality of the finished product.

In conformity with an advantageous arrangement of the process according to the invention, the conching temperature is between 50° and 85° C.

In the case of milk chocolate or white chocolate manufacturing, the temperature is preferably between 63° and 67° C., and still more preferably it is of the order of 65° C.

With respect to dark chocolate, this temperature is preferably between 75° and 85° C., and still more preferably it is of the order of 80° C.

In the case where the sweetening mass comprises maltitol and/or lactitol and/or hydrogenated isomaltulose, these polyols preferably have a chemical purity greater than or equal to 92%, and are present in anhydrous form, that is to say that they contain less than 1% water.

The many advantages and variants of the invention, both with respect to chocolate with a reduced fat content and the process for manufacturing chocolate of this type, will emerge from the exemplary embodiments and implementation below.

The general process which is common to all the examples for chocolate manufacturing conforming to the invention comprises the following stages: kneading—refining—optionally, dry conching—liquid conching—tempering—moulding—cooling—packaging.

The basic ingredients used for the preparation of dark chocolate are as follows:
- cocoa butter obtained from the company CACAO BARRY,
- cocoa paste containing 54% of fatty substances which are also obtained from the company CACAO BARRY,
- sweetening mass in pulverulent form
- emulsifier—soya bean lecithin marketed by the company LUCA MEYER.

The kneading consists in intimately mixing the cocoa paste tempered at 45° C., the sweetening mass and, optionally, part of the cocoa butter also tempered at 45° C. using a kneading machine equipped with "Z"-shaped arms of the type marketed by the company SVIAC. The kneading lasts for about ten minutes at room temperature.

The mixture obtained, which is in a paste form, is then subjected to refining consisting of passing it twice through a three-roll mill which is conventionally used in chocolate manufacture.

The grinding pressures are adjusted to 15 bars for the first passage and to 20 bars for the second. The starting paste progresses towards a more or less fatty pulverulent state. A good progression of this operation requires a paste which is sufficiently bound so as to be capable of satisfactorily spreading out on the grinding rolls. It should be noted that a homogeneous paste without fatty exudations should be obtained after refining.

The refined powder is then optionally treated by dry conching at a temperature which is chosen as a function of the nature of the constituents of the sweetening mass. This dry conching consists in aeration by mechanical agitation of the powder which assumes a pasty texture, and this for a period of five hours.

Next is the liquid conching which starts with the addition of the remaining cocoa butter which is melted beforehand. The duration of this agitation, which takes place at a temperature identical to that of the optional dry conching, is about seven hours. Lecithin is added to the paste one hour before the end of the conching.

The conched paste is subjected, for half an hour, to tempering in a jacketed mixer in which a liquid coolant circulates which gives the paste a temperature of 28°–29° C. depending on the fat content of the paste.

After 30 minutes, the temperature is increased by a few degrees so as to eliminate the unstable crystalline forms.

The paste is then moulded into moulds which are cooled for half an hour at 4° C. before removing from the moulds.

EXAMPLE I

Comparison of the various sweetening substances used in constituting the sweetening mass of dark chocolates.

To prepare the dark chocolates, the methodology described above was followed:

Table 1 summarises the operating conditions.

In this table, lecithin is included in the total fatty substances indicated.

TABLE I

| | | Composition of the sweetening mass | | | | | | | |
|---|---|---|---|---|---|---|---|---|---|
| | | 100% polydextrose, LITESSE | 100% Lactitol, LACTY M | 100% hydrogenated isomaltulose | 100% Maltitol | 100% Sucrose | 100% Sorbitol | 100% Mannitol | 100% Xylitol |
| Composition during refining | Cocoa paste | | | 400 parts by weight | | | | | |
| | Sweetening mass | | | 400 parts by weight | | | | | |
| | Cocoa butter | | | 40 parts by weight | | | | | |
| Pressures during refining | 1st passage | | | 15 bars | | | | | |
| | 2nd passage | | | 20 bars | | | | | |
| Ingredients added during conching (parts by weight) | Cocoa butter | 18.2 | 18.2 | 18.2 | 18.2 | 18.2 | 37 | 27 | 27 |
| | Soya bean lecithin | 1.7 | 1.7 | 1.7 | 1.7 | 1.7 | 3.36 | 1.7 | 1.7 |
| Conching temperature in °C. | | 65 | 65 | 65 | 80 | 80 | 46 | 80 | 65 |
| Total fatty substances over all the ingredients (% by weight) | | 32 | 32 | 32 | 32 | 32 | 33.6 | 32.7 | 32.8 |

The polydextrose used is that marketed by the company PFIZER under the registered trade mark LITESSE.

The lactitol used is that in crystallised monohydrate form which is designated by the registered trade mark LACTY M and marketed by the company CCA BIOCHEM B.V.

The hydrogenated isomaltulose used is that marketed under the registered trade mark PALATINIT by the company SUDDEUTSCHE ZUCKER GmbH.

The maltitol A is a crystallised maltitol of a purity of 99.3% by weight, which is obtained by the process described in European Patent No. 189,704, the patentee of which is the company ROQUETTE FRERES.

The sucrose, sorbitol, mannitol and xylitol are crystallised powders which are available commercially.

It is evident from this series of tests that, among the polyols tested, only the polyols selected in conformity with the present invention make it possible to prepare a dark chocolate having an acceptable taste and a fat content of the order of 32% by weight relative to the cocoa paste, the cocoa butter, the sweetening mass and the emulsifier. The dark chocolate manufactured with the polydextrose LITESSE can be easily produced with a reduced fat content and it possesses average organoleptic properties.

By way of comparison, sucrose, which is the reference product in the chocolate industry, did not permit better results to be obtained with respect to the reduction of fats.

It should be noted that maltitol A has the advantage of allowing a conching temperature of the order of 80°

C., which is similar to that used for sugar. It is an ideal temperature for conching.

EXAMPLE II

Tests for reducing the fat content of dark chocolates containing sweetening substances conforming to the invention and which are selected from Example I.

The advantages of using the polyols conforming to the invention can be seen on reading Table II. This table presents the operating conditions and the results of the various tests carried out.

The components of the sweetening mass used were as follows.

Maltitol A

Crystallised maltitol manufactured by the company ROQUETTE FRERES, which has a chemical purity of 99.3%, the batch used containing, in this particular case, 0.05% by weight of water.

Maltitol B

Maltitol powder marketed under the registered trade mark AMALTY MR 56, by the company TOWA CHEMICALS, the batch used having, in this particular case, a purity of 88.5% and a water content of 1.20%.

Lactitol C

Lactitol monohydrate marketed by the company CCA BIOCHEM B.V. under the registered trade mark LACTY M, the batch used having, in this particular case, 5.30% by weight of water.

Lactitol D

Lactitol D dehydrated under high vacuum, containing 0.04% by weight of water.

Hydrogenated Isomaltulose E

Powder marketed by the company SUDDEUTSCHE ZUCKER GmbH under the registered trade mark PALATINIT, the batch used having, in this particular case, 5.1% by weight of water.

Hydrogenated Isomaltulose F

Powder E dehydrated under high vacuum, containing 0.05% by weight of residual water.

Polydextrose G

Powder marketed under the registered trade mark LITESSE by the company PFIZER, the batch used containing, in this particular case, 2.10% by weight of water.

Xylitol H

Crystallised xylitol manufactured and marketed by the company ROQUETTE FRERES, the batch used containing 0.2% by weight of water.

Comments on Table II

The dark chocolate compositions indicated in this Table II correspond to the best results obtained with each of the sweetening substances tested, it being understood that the operating conditions could still be optimised to give products which are even lower in fatty substances. The total conching time is 15 hours.

It can be observed that maltitol A of high purity permits the highest reduction in final total fatty substances to be obtained relative to all the other sweetening substances selected (26.5% by weight).

TABLE II

|  |  | Composition of the sweetening mass | | | | | | | |
|---|---|---|---|---|---|---|---|---|---|
|  |  | 100% Maltitol A | 100% Maltitol B | 100% Lactitol C | 100% Lactitol D | 100% hydrogenated isomaltulose E | 100% hydrogenated isomaltulose F | 50% Maltitol A 50% polydextrose G | 90% Maltitol A 10% xylitol H |
| Composition during refining (parts by weight) | Cocoa paste | 400 parts by weight | | | | | | | |
|  | Sweetening mass | 550 parts by weight | | | | | | | |
|  | Cocoa butter (minimum amounts required for refining) | 0 | 0 | 45 | 0 | 0 | 45 | 40 | 0 | 0 |
| Total fatty substances during refining (% by weight) |  | 22.7 | 22.7 | 26.2 | 22.7 | 22.7 | 26.2 | 26.2 | 22.7 | 22.7 |
| Conching temperature °C |  | 80 | 80 | 65 | 65 | 80 | 46 | 80 | 80 | 80 |
| Dry conching time |  |  |  |  |  |  | 3 HOURS |  |  |  |
| Ingredients added during liquid conching (p/w) | Added cocoa butter | 44 | 57 | 87 | 84.3 | 80.7 | Impossible to produce | 85 | 57 | 55 |
|  | Soya bean lecithin | 5.0 | 5.0 | 6.6 | 7.7 | 5.2 |  | 5.0 | 5.0 | 5.0 |
| Final total fatty substances (including lecithin) over all the ingredients (weight (%)) |  | 26.5 | 27.5 | 32.6 | 29.5 | 29.1 | — | 31.9 | 27.5 | 27.4 |
| Taste |  | Sweet pleasant | Sweet pleasant | Barely sweet good | | | — | Barely sweet | Barely sweet good | Very sweet little cool-effect |
| Colour |  | Very dark | Milk chocolate | | | | — | | Dark | Very dark | Dark |

In Table II, final total fatty substances are understood to mean the total fatty substances, therefore comprising lecithin, expressed in % by weight over all the ingredients.

The maltitol B of lesser purity, required the use of a higher amount of fatty substances. It was even necessary to add more of it during the refining because of the high absorbing power of this product towards fatty substances.

The lactitol C also gave good results with respect to the final reduction of fats (29.5% by weight), knowing that this reduction can be further improved by using dehydrated lactitol D (29.1%). The dehydration of the lactitol also made it possible to substantially reduce the lecithin content required for improving the rheological properties.

As far as hydrogenated isomaltulose is concerned, the dry conching was only possible using a dehydrated form which also permitted a useful reduction (31.9% by weight).

The combination of maltitol A and polydextrose G or xylitol H in the sweetening mass gives an advantageous result with respect to the reduction in fatty substances without creating technological difficulties. It is not necessary to add more of it during the refining.

Regarding the appearance and the organoleptic qualities of the chocolates manufactured, they are all satisfactory, with a particular preference for those containing maltitol A of high purity, combined or not with xylitol H. The cooling effect of xylitol, which is conventionally considered as being undesirable in chocolate, is not substantial when it is used in an amount of 10% by weight in the sweetening mass.

EXAMPLE III

Tests for reducing the fat content of white chocolate, milk chocolate and cocoa-rich dark chocolate base for filled chocolates.

In all these tests, the sweetening mass is wholly composed of the crystallised maltitol A of high purity which is used in Examples I and II and manufactured by the company ROQUETTE FRERES.

The manufacturing techniques used conform to those of Example I.

Table III presents the manufacturing conditions and the characteristics of the chocolates obtained after the tests.

TABLE III

| | | White chocolate | Milk type chocolate | Cocoa-rich dark chocolate for filled chocolates |
|---|---|---|---|---|
| Composition during refining (parts by weight) | Cocoa paste | — | 240 | 495 |
| | Dessicated defatted cocoa 10% FS | — | — | 75 |
| | Lactose-free milk proteins | 150 | 135 | — |
| | Cocoa butter | 200 | 92.5 | — |
| | AFM* | 50 | — | — |
| | Sweetening mass (Maltitol A) | 545 | 825 | 400 |
| Total fatty substances during refining (% by weight) | | 25 | 17.2 | 28.6 |
| Conching temperature (°C.) | | 65 | 65 | 80 |
| Dry conching time (hours) | | 15 | 15 | 15 |
| Ingredients added during conching (parts by weight) | Added cocoa butter | 50 | 267 | 30 |
| | Soya bean lecithin | 5 | 7.7 | 5 |
| Final total fatty substances (including lecithin) over all the ingredients (% by weight) | | 30.5 | 31.7 | 31 |
| Taste | | Sweet pleasant | Sweet pleasant | Sweet pleasant |
| Colour | | Cocoa butter (off-white) | Pale colour | Very very dark |

*AFM: anhydrous milk fat

It is evident that the use of crystallised maltitol of high purity in conformity with the invention makes it possible to prepare white chocolate, milk chocolate or a concentrated dark chocolate base for filled chocolates containing a reduced fat content of 30.5, 31.7 and 31% respectively, without posing technological difficulties during manufacturing.

The chocolates obtained have a nice appearance and are quite tasty while having the advantage of reduced calories which is very attractive to the consumer.

It should be noted that the conching temperatures—65° C. for white chocolate and milk chocolate and 80° C. for concentrated dark chocolate—are similar to those for sucrose-based conventional technology and they represent an optimum with respect to the development of a proper flavour profile for the chocolates.

We claim:

1. A low calorie dark chocolate comprising fat, a sweetening mass, at least one emulsifier, and desiccated cocoa or cocoa paste, wherein the sweetening mass comprises a product selected from the group consisting of maltitol, lactitol, hydrogenated isomaltulose and low-calorie saccharide polymers, and wherein the total fat content of the composition is less than 32% by weight, said chocolate having technical and organoleptic properties comparable to those of traditional sucrose-containing chocolate.

2. A low-calorie white chocolate comprising fat, a sweetening mass, at least one emulsifier, and a pulverulent milky product or derivative thereof, wherein the sweetening mass comprises a product selected from the group consisting of maltitol, lactitol, hydrogenated isomaltulose and low-calorie saccharide polymers, and wherein the total fat content of the composition is less than 32% by weight, said chocolate having technical and organoleptic properties comparable to those of traditional sucrose-containing chocolate.

3. A low-calorie milk chocolate comprising fat, a sweetening mass, at least one emulsifier, desiccated cocoa or cocoa paste, and a pulverulent milky product or derivative thereof, wherein the sweetening mass comprises a product selected from the group consisting of maltitol, lactitol, hydrogenated isomaltulose and low-calorie saccharide polymers, and wherein the total fat content of the composition is less than 32% by weight, said chocolate having technical and organoleptic properties comparable to those of traditional sucrose-containing chocolate.

4. A low-calorie chocolate according to anyone claims 1 to 3, wherein the constituents of the sweetening mass are in anhydrous or dehydrated form, with a water content of less than 1%.

5. A low-calorie chocolate according to claim 4, wherein the constituents of the sweetening mass are anhydrous or dehydrated form, with a water content of less than 0.5 %.

6. A low-calorie chocolate according to anyone of claims 1 to 3, wherein the total fat content is less than 31% by weight.

7. A low-calorie chocolate according to claim 6, wherein the total fat content is less than 29% by weight.

8. A low-calorie chocolate according to anyone of claims 1 to 3, wherein the maltitol is crystallized maltitol having a maltitol content of not less than 92%.

9. A low-calorie chocolate according to claim 8, wherein the maltitol is crystallized maltitol having a maltitol content of not less than 95%.

10. A low-calorie chocolate according to claim 9, wherein the maltitol is crystallized maltitol having a maltitol content of not less than 97%.

11. A low-calorie chocolate according to anyone of claims 1 to 3, comprising 35 to 65% by weight of crystallized polyol as sweetening mass, 20 to 32% by weight of fatty substances.

12. A low-calorie chocolate according to claim 11, comprising:

45 to 55% by weight of crystallized polyol as sweetening mass, 25 to 32% by weight of fatty substances.

13. A low-calorie chocolate according to anyone of claims 1 to 3, including an intense sweetening agent.

14. A low-calorie chocolate according to anyone of claims 1 to 3, wherein the emulsifier is lecithin.

15. A process for manufacturing a low-calorie dark chocolate having a total fat content less than 32% by weight, and comprising fat, at least one emulsifier, desiccated cocoa or cocoa paste, and a sweetening mass comprising a product selected from the group consisting of maltitol, lactitol, hydrogenated isomaltulose and low-calorie saccharide polymers, said process comprising kneading said fat, sweetening mass, emulsifier and desiccated cocoa or cocoa paste so as to obtain a homogeneous paste, refining the paste so as to obtain a powder, and conching the refined powder at a temperature of between 75° and 85° C. to produce a low calorie dark chocolate, said chocolate having technical and organoleptic properties comparable to those of traditional sucrose-containing chocolate.

16. A process for manufacturing low-calorie dark chocolate according to claim 15, wherein the conching comprises dry conching.

17. A process for manufacturing low-calorie dark chocolate according to claim 15, wherein the conching comprises liquid conching.

18. A process for manufacturing a low-calorie white chocolate having a total fat content of less than 32% by weight, and comprising fat, at least one emulsifier, a pulverulent milky product or derivative thereof and a sweetening mass comprising a product selected from the group consisting of maltitol, lactitol, hydrogenated maltulose and low-calorie saccharide polymers, said process comprising kneading said fat, sweetening mass, emulsifier and pulverulent milky product or derivative thereof so as to obtain a homogeneous paste, refining the paste so as to obtain a powder, and conching the refined powder at a temperature of between 50° and 85° C. to produce a low calorie white chocolate, said chocolate having technical and organoleptic properties comparable to those of traditional sucrose-containing chocolate.

19. A process for manufacturing low-calorie white chocolate according to claim 18, wherein the conching temperature is of between 63° and 67° C.

20. A process for manufacturing low-calorie white chocolate according to claim 18, wherein the conching comprises dry conching.

21. A process for manufacturing low-calorie white chocolate according to claim 18, wherein the conching comprises liquid conching.

22. A process for manufacturing a low-calorie milk chocolate having a total fat content of less than 32% by weight, and comprising fat, at least one emulsifier, desiccated cocoa or cocoa paste, a pulverulent milky product or derivative thereof and a sweetening mass comprising a product selected from the group consisting of maltitol, lactitol, hydrogenated isomaltulose and low-calorie saccharide polymers, said process comprising kneading said fat, sweetening mass, emulsifier, desiccated cocoa or cocoa paste and pulverulent milky product or derivative thereof so as to obtain a homogeneous paste, refining the paste so as to obtain a powder, and conching the refined powder at a temperature of between 63° and 67° C. to produce a low calorie milk chocolate, said chocolate having technical and organoleptic properties comparable to those of traditional sucrose-containing chocolate.

23. A process for manufacturing low-calorie milk chocolate according to claim 22, wherein the conching comprises dry conching.

24. A process for manufacturing low-calorie milk chocolate according to claim 22, wherein the conching comprises liquid conching.

* * * * *

UNITED STATES PATENT AND TRADEMARK OFFICE
CERTIFICATE OF CORRECTION

PATENT NO. : 5,360,621

DATED : November 1, 1994

INVENTOR(S) : MENTINK et al.

It is certified that error appears in the above-identified patent and that said Letters Patent is hereby corrected as shown below:

Column 16, line 45, (claim 4), after "anyone" insert --of--.

Column 16, line 50, (claim 5), after "are" insert --in--.

Signed and Sealed this

Thirty-first Day of January, 1995

Attest:

BRUCE LEHMAN

Attesting Officer

Commissioner of Patents and Trademarks